(12) United States Patent  
Takeya

(10) Patent No.: US 8,379,236 B2  
(45) Date of Patent: Feb. 19, 2013

(54) IMAGE FORMING DEVICE

(75) Inventor: Hitoshi Takeya, Tokyo (JP)

(73) Assignee: Oki Data Corporation, Tokyo (JP)

( * ) Notice: Subject to any disclaimer, the term of this patent is extended or adjusted under 35 U.S.C. 154(b) by 434 days.

(21) Appl. No.: 12/699,388

(22) Filed: Feb. 3, 2010

(65) Prior Publication Data

US 2010/0208285 A1    Aug. 19, 2010

(30) Foreign Application Priority Data

Feb. 13, 2009   (JP) ................................. 2009-031201

(51) Int. Cl.
*G06F 15/00* (2006.01)
*G06F 15/16* (2006.01)

(52) U.S. Cl. .................................... 358/1.13; 709/217

(58) Field of Classification Search ................... 358/1.13
See application file for complete search history.

(56) References Cited

U.S. PATENT DOCUMENTS

2006/0099947 A1* 5/2006 Shozaki et al. ............ 455/435.1
2007/0124516 A1* 5/2007 Ohara et al. ................... 710/62
2007/0150536 A1* 6/2007 Ahmed et al. ............... 709/203
2009/0006652 A1* 1/2009 Kasatani ...................... 709/248

FOREIGN PATENT DOCUMENTS

JP      2007-310768 A    11/2007

* cited by examiner

*Primary Examiner* — Saeid Ebrahimi Dehkordy  
(74) *Attorney, Agent, or Firm* — Posz Law Group, PLC

(57) ABSTRACT

An image forming device for obtaining image data and forming an image includes a functional limitation part configured to set a functional limitation for a function provided by the image forming device; a batch operating part configured to register a series of the functions as one batch operation; a judging part configured to judge whether or not the batch operation registered by the batch operating part is executable when the functional limitation part adds a new limitation to or changes setting contents of the functional limitation; and an alternative operation generating part configured to generate an alternative batch operation that is an alternative of the batch operation when the batch operation is judged inexecutable.

14 Claims, 24 Drawing Sheets

Reg. 3: "Document Copy"

| No. | Individual Operation | Value |
|---|---|---|
| 1 | Sheet Selection | A4 |
| 2 | Double Side Reading/Print Selection | Double Side Reading → One Side Print |
| 3 | Reading Resolution Selection | 600 [dpi] |
| 4 | Density Setting | +3 |
| 5 | Copy Number Setting | 10 Copies |
| 6 | Color/Mono Setting | Color |
| 7 | Copy Execution | Execute |

Fig. 4

| No. | Function Limitation Item | Individual Operation of Target (The items are Shown with No.) | | | | |
|---|---|---|---|---|---|---|
| | | op1 | op2 | op3 | ... | opL |
| r1 | No One Side Print | ○ | ○ | — | ... | — |
| r2 | No Munti-Page Print | ○ | ○ | — | ... | — |
| r3 | No Color Print | ○ | — | ○ | ... | — |
| ... | ... | ... | ... | ... | ... | ... |
| rk | No Setting Change of Device Management Information | — | — | — | ... | ○ |

Fig. 6

| No. | Individual Operation Item | Executed Single Function (Item with No.) | | | | Setting/Setting Item to be used (Item with No.) | | | |
|---|---|---|---|---|---|---|---|---|---|
| | | f1 | f2 | ... | fP | v1 | v2 | ... | vQ |
| op1 | Copy Execution | Exe | Exe | ... | — | Use | Use | ... | |
| op2 | Fax Receive Print Execution | Exe | — | ... | — | Use | | ... | |
| op3 | Color/Mono Setting | — | — | ... | — | — | Set | ... | |
| ... | ... | ... | ... | ... | ... | ... | ... | ... | ... |
| opL | Specification Change Setting | — | — | ... | — | — | | ... | set |

Fig. 7

| No. | Setting Item |
|---|---|
| v1 | Copy Number of Print |
| f2 | Color/Mono |
| ... | ... |
| vQ | Specification |

Fig. 9

| No. | Single Function Item |
|---|---|
| f1 | Print |
| f2 | Scan |
| ... | ... |
| fp | Send Fax |

Fig. 8

| No. | Group User | Target of Functional Limitation (Items with No.) | | | | |
|---|---|---|---|---|---|---|
| | | r1 | r2 | r3 | ... | rK |
| g1 | Device Manager | — | — | — | ... | — |
| g2 | Executive A | — | — | — | ... | ○ |
| g3 | Associate B | ○ | ○ | ○ | ... | ○ |
| ... | | | | | ... | |
| gJ | Guest User X | ○ | ○ | ○ | ... | ○ |

Fig. 10

| No. | Individual User | Target of Functional Limitation (Items with No.) | | | | |
|---|---|---|---|---|---|---|
| | | r1 | r2 | r3 | ... | rK |
| g1 | user_a | — | ○ | — | ... | — |
| g2 | user_b | — | — | ○ | ... | ○ |
| ... | | | | | ... | |

Fig. 11

| Group User Setting: Associates | | | | | | | | |
|---|---|---|---|---|---|---|---|---|
| No. | Functional Limitation Item | Single Function Limitation Value (Items with No.) | | | | Setting Value of Setting Item (Item with No.) | | |
| | | f1 | f2 | ... | fP | v1 | v2 | ... | vQ |
| g1 | No One Side Print | Limitation | — | ... | — | — | | ... | |
| g2 | Limitation of Copy Number | Limitation | — | ... | — | No More Than 10 Pages | | ... | |
| g3 | No Color Print | Limitation | — | ... | — | — | No Color Print | ... | |

| Individual User Setting: User A | | | | | | | |
|---|---|---|---|---|---|---|---|
| No. | Functional Limitation Item | Operation Classification Item and Limitation Content (Item with No.) | | | | Target of Setting Classification (Item with No.) | |
| | | f1 | f2 | ... | fP | v1 | v2 | ... | vQ |
| g2 | Limitation of Copy Number | Limitation | — | ... | — | No More Than 5 Pages | | ... | |

Fig. 14

| No. | Functional Limitation Item | Alternative Operation, Alternative Setting |
|---|---|---|
| r1 | No One Side Print | Integration Setting, Double Side Print Setting |
| r2 | Limitation of Copy Number | Integration Setting, Double Side Print Setting |
| r3 | No Color Print | Color/Mono Setting |
| ... | ... | — |
| rK | No Setting Change of Device Management Information | — |

Fig. 15

| Setting Item | | Value | |
|---|---|---|---|
| | | Before Collection | After Collection |
| Nup | Reading Resolution | 600 [dpi] | 300 [dpi] |
| | | 300 [dpi] | 150 [dpi] |
| | | 150 [dpi] | 75 [dpi] |

| No. | Individual Operation | Value | Processing State |
|---|---|---|---|
| 1 | Local Folder Designation | Execution Time Setting | Done |
| 2 | Scan To Local Folder Execution | Execute | Done |
| 3 | Copy Numbe Setting | 10 Copies | Done |
| 4 | Color/Mono Designation | Color | Done |
| 5 | Local Folder Designation | Execution Time Setting | Done |
| 6 | Local Folder To Print Execution | Execute | Stop |

Functional Relaxing Data (Stop Process A)

| No. | Functional Limitation Item | Operation Classification Item and Limitation Content (Item with No.) | | | | Target of Setting Classification (Item with No.) | | | |
|---|---|---|---|---|---|---|---|---|---|
| | | f1 | f2 | f3 | ... | v1 | v2 | ... | vQ |
| p2 | Local Folder To Print | Permission | — | Permission | ... | | | | |

Single Function of "f3" ... Temporary Permission of "Reading from Local Folder"

IMAGE FORMING DEVICE

CROSS REFERENCE TO RELATED APPLICATION

The present application is related to, claims priority from and incorporates by reference Japanese patent application number 2009-031201, filed on Feb. 13, 2009.

TECHNICAL FIELD

The present invention relates to an image forming device.

BACKGROUND

Conventionally, with an image forming device such as a multi function printer (MFP), connected to a network such as local area network (LAN), an access control feature may be executed. The access control feature, limits or prohibits certain operations of the image forming device such as, for example, the number of print copies, printing, and/or writing of a scanned image to a portable storage medium (for example, refer to Japanese laid-open patent application publication number 2007-310768). Also, an image forming device is proposed that is equipped with a batch operation function that can execute a series of operation items with one operation when the series of operation items is registered in advance.

However, with a conventional image forming device, a user who registers a batch operation is not able to execute the batch operation without access privileges when the access control feature places a functional limitation on operation items included in the registered batch operation has became a target of the functional limitation. Then, when the user executes the batch operation without knowing that the batch operation is inexecutable without access privileges, the user receives an error notice. Accordingly, the user is not able to understand the reason why the batch operation was not executed. Moreover, if the user is able to understand the reason, the user must execute each operation of the operation items included in the batch operation again, therefore requiring extra time and effort from the user.

An object of the present invention is to provide a more convenient and easily operable image forming device by solving the problems of the conventional image forming device by generating an alternative batch operation, and by displaying both an indication that the registered batch operation has became impossible to execute as well as contents of the alternative batch operation, when an access control places functional limitations on operation items of the registered batch operation and the registered batch operation has became impossible to execute. Therefore, the users can understand the reason why the batch operation is impossible to execute, and can execute the alternative batch operation confirming the contents of the alternative batch operation.

SUMMARY

Therefore, an image forming device of the present application for obtaining image data and forming an image includes a functional limitation part configured to set a functional limitation for a function provided by the image forming device; a batch operating part configured to register a series of the functions as one batch operation; a judging part configured to judge whether or not the batch operation registered by the batch operating part is executable when the functional limitation part adds a new limitation to or changes setting contents of the functional limitation; and an alternative operation generating part configured to generate an alternative batch operation that is an alternative of the batch operation when the batch operation is judged inexecutable.

According to the present invention, when functional limitations are placed on operation items in a batch operation, and a registered batch operation has became inexecutable, an image forming device generates an alternative batch operation, and displays that the registered batch operation has became inexecutable and the contents of the alternative batch operation. Therefore, users can understand a reason why the batch operation has became inexecutable, and the users can execute the alternative batch operation confirming the contents. At the result, the image forming device, for users, is easier and more convenient to use.

BRIEF DESCRIPTION OF THE DRAWINGS

FIG. 4 is a table of a series of plural number of operation items registered as a batch operation of the first embodiment.

FIG. 6 illustrates a table, in the first embodiment, of a functional limitation and individual operations which are a target of the functional limitation.

FIG. 7 is a table, in the first embodiment, of an individual operation item, and a single function and a setting item.

FIG. 8 is a table of a single function item of the first embodiment.

FIG. 9 is a table of the setting item of the first embodiment.

FIG. 10 is a table, in the first embodiment, of a group user and a target of the functional limitation.

FIG. 11 is a table, in the first embodiment, of an individual user and a target of the functional limitation.

FIG. 12 is a table of a group user setting of the first embodiment.

FIG. 13 is a table of an individual user setting of the first embodiment.

FIG. 14 is a table listing items which can be an alternative setting corresponding to the functional limitation of the first embodiment.

FIG. 15 is a table showing a setting item and its value which are necessary when accompanied by a change of the setting item of the first embodiment.

FIG. 22 shows data where the process had been executed until it reaches an individual operation that is executable by a batch operation of the second embodiment, and stopped in the middle of the process.

FIG. 24 is a chart showing a table of functional relaxing data to temporarily relax the functional limitation of the second embodiment.

DETAILED DESCRIPTION

Hereafter, embodiments of the present invention will be described in detail with reference to drawings.

Figure 1:
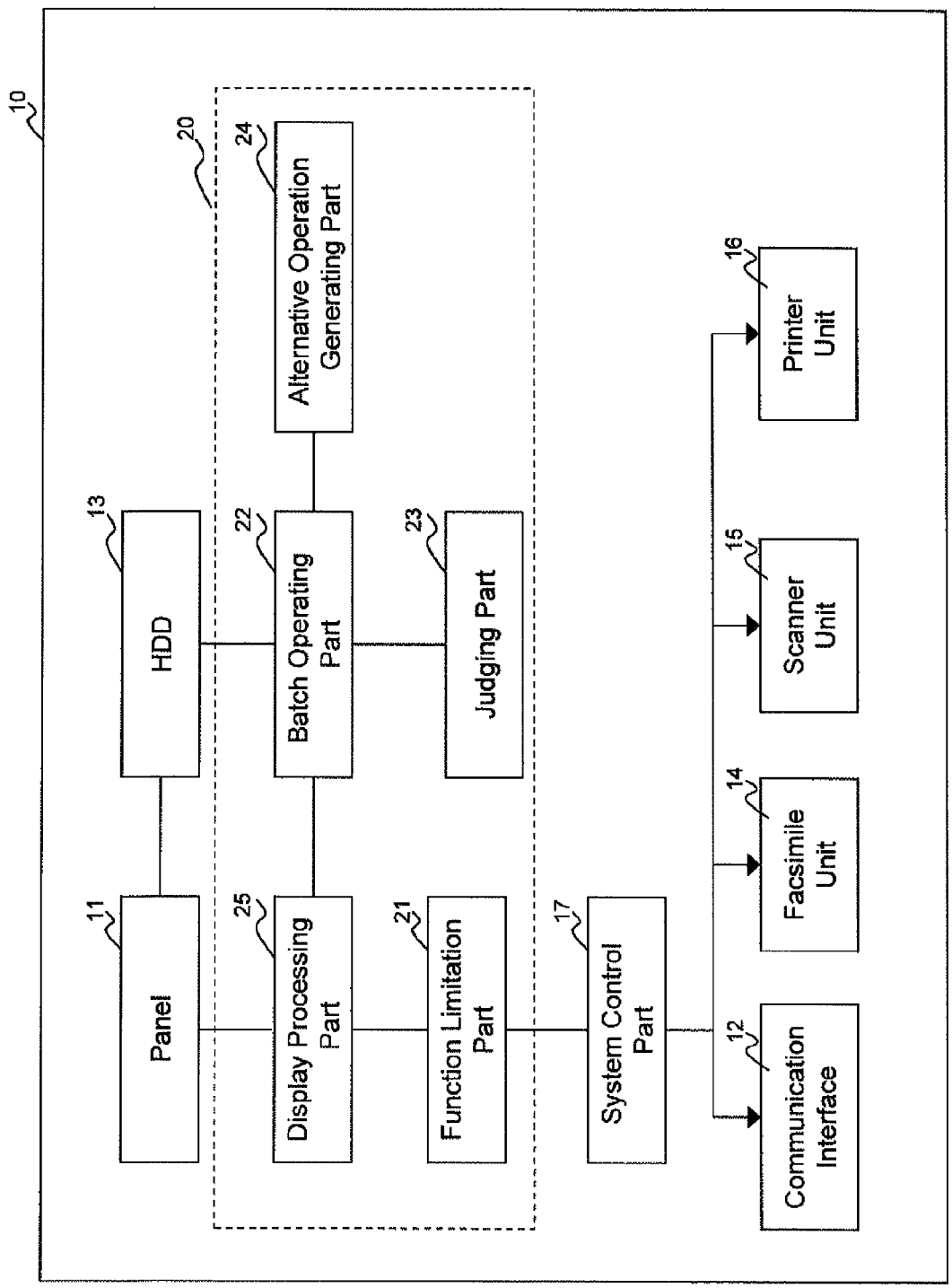
FIG. 1 is a block diagram illustrating a configuration of an image forming device of a first embodiment.

In FIG. 1, the image forming device 10 is a multi function printer (MFP) having, for example, functions of a printer, facsimile, and photocopier, or of a scanner, printer, facsimile, and photocopier. The image forming device 10 uses, for example, an inkjet method, electrographic method, or a thermal transfer method. If the image forming device 10 can form an image on a medium such as printing paper, any type of printing method is acceptable. Here, the image forming device will be described as a MFP and as connected to a communication network such as a LAN, not shown.

The image forming device 10 has a panel 11, a communication interface 12, a hard disk drive (HDD) 13, a facsimile unit 14, a scanner unit 15, a printer unit 16, a controller unit (CU) 20, and a system control part 17. The display panel 11 functions as a display and a user input by which a user can confirm a condition of the image forming device 10 and give operation instructions. The communication interface 12 connects the image forming device 10 with machinery such as a printer through a communication network, and transmits and receives data. The HDD 13 stores, for example, image data which the image forming device 10 processes. The facsimile unit 14 is configured to perform a function of a facsimile. The scanner unit 15 is configured to perform a scanning function which reads an image and converts the image to electronic data. The printer unit 16 is configured to perform a printing function by receiving image data transmitted by the communication interface 12, the facsimile unit 14, and the scanner unit 15, and prints the image data. The CU 20 is configured to control the display panel 11, the communication interface 12, the HDD 13, the facsimile unit 14, the scanner unit 15 and the printer unit 16.

The CU 20 has a functional limitation part 21, a batch operating part 22, a judging part 23, an alternative operation generating part 24 and a display processing part 25. The functional limitation part 21 limits a privilege to use a function provided by the image forming device 10. The batch operating part 22 is configured to execute a series of operating items by registering the series of operating items as a target in advance and executing the batch operation one time. The judging part 23 is configured to judge whether or not an already registered batch operation is affected, when the functional limitation part 21 executes a new additional setting or a change of setting contents of functional limitation. The alternative operation generating part 24 is configured to generate an alternative batch operation when the batch operation is inexecutable or, in other words, is impossible to execute. The display processing part 25 is configured to display a judgment result judged by the judging part 23 and the alternative batch operation generated by the alternative operation generating part 24 on the display panel 11.

Next, display contents of the display panel 11 will be explained referring to FIGS. 2 and 3.

Figure 2:
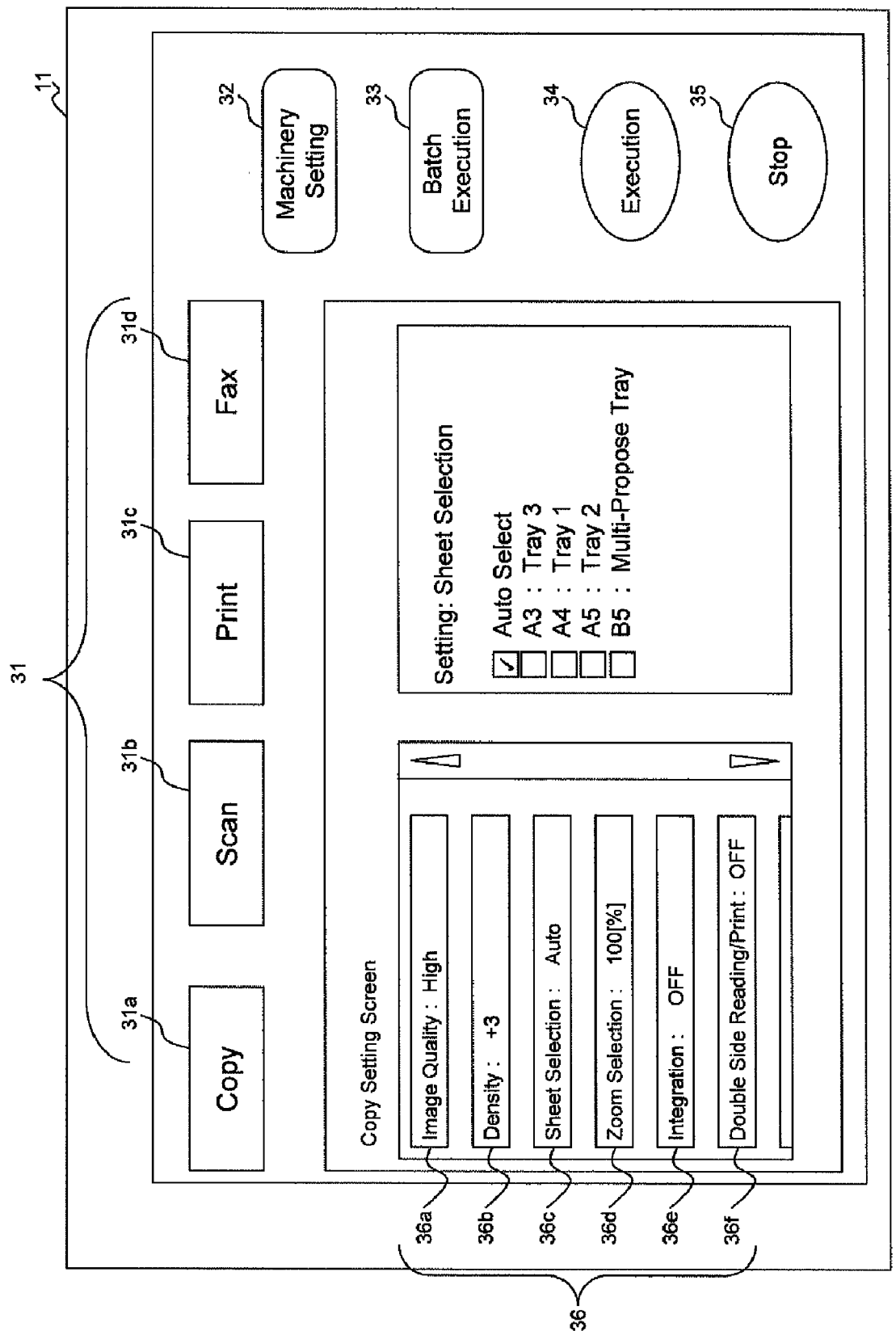
FIG. 2 is a first view illustrating a display example of a panel of the image forming device of the first embodiment.

FIG. 2 shows an example of display contents displayed on a screen of the display panel 11. In an upper portion of the screen of the display panel 11, a copy selection button 31a, a scan selection button 31b, a print selection button 31c and a fax selection button 31d (hereafter, collectively referred as function selection buttons 31) are horizontally disposed. The buttons enable a user to select each function of the image forming device 10: a photocopier, scanner, printer and facsimile. In addition, FIG. 2 shows a case when the copy selection button 31a is pressed and the function of the photocopier is selected.

Under the function selection buttons 31, a copier setting screen is displayed to set each of the sub items corresponding to the function of the photocopier. In the copier setting screen, setting buttons 36a, 36b, 36c, 36d, 36e and 36f (hereafter, collectively referred as a sub item setting button 36) are longitudinally disposed to enable selective settings of each of the sub items such as image quality and density. In addition, FIG. 2 shows the case that a sheet selection button 36c is pressed, and sheet selection is selected as the setting item.

On the right side of the copier setting screen, a machinery setting button 32, a batch execution button 33, an execution button 34 and a stop button 35 are disposed. The machinery setting button 32 enables a machinery setting of the image forming device 10 to be confirmed or changed. The batch execution button 33 enables a batch operation to be performed. The execution button 34 enables functions as a photocopier, scanner, printer and facsimile to be performed. The stop button 35 is an operation method to stop the functions as the photocopier, scanner, printer and facsimile.

Figure 3:
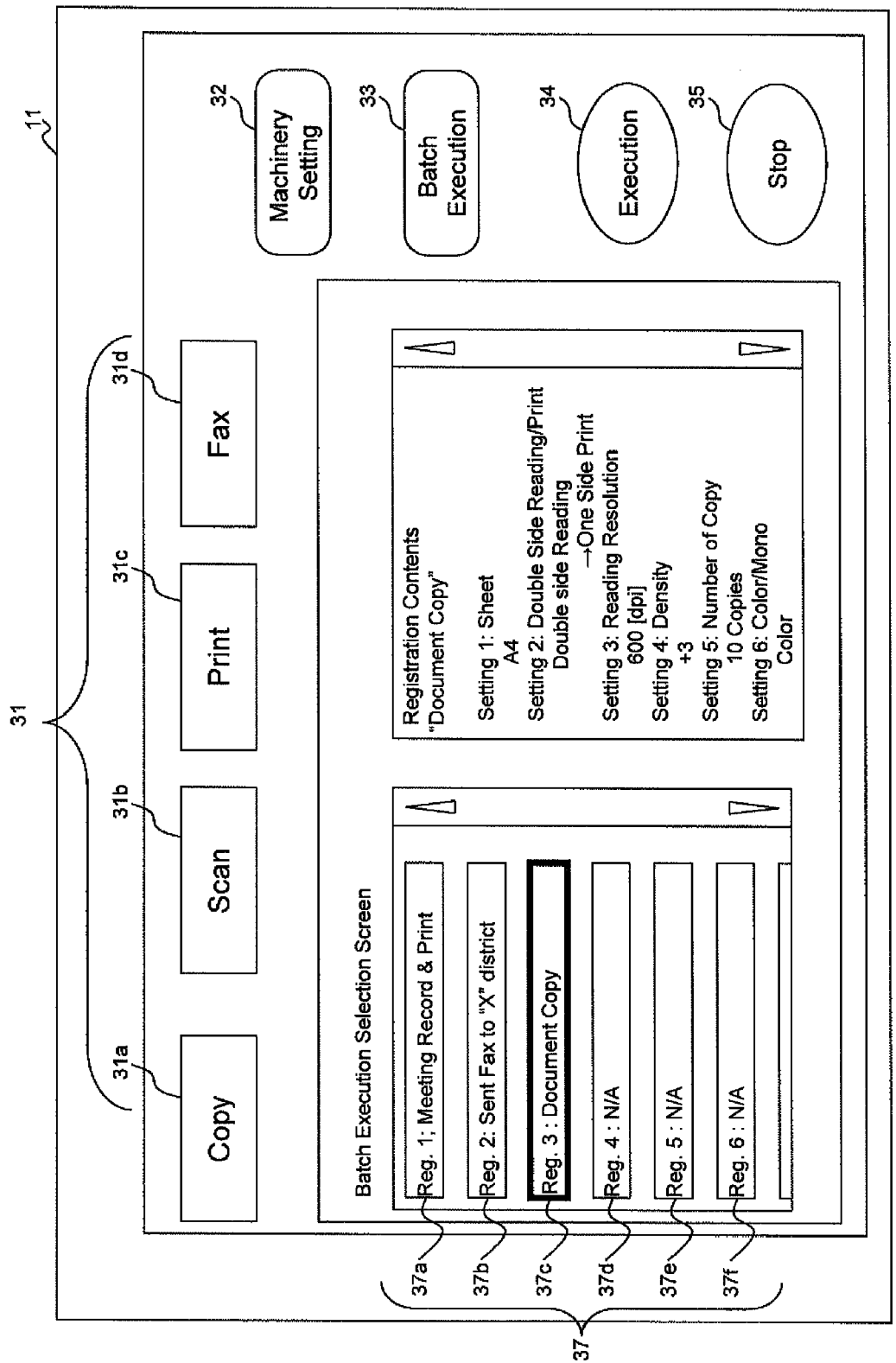
FIG. 3 is a second view illustrating a display example of the panel of the image forming device of the first embodiment.

The batch execution button 33 enables the screen of the display panel 11 to be changed to a batch execution screen as shown in FIG. 3. Below the machinery selection button 31 of the batch execution screen, a batch execution selection screen is displayed to enable a series of operation items that are registered as the batch operation. In the batch execution selection screen, selection buttons 37a, 37b, 37c, 37d, 37e and 37f (hereafter, collectively referred as a registered batch operation selection button 37) are longitudinally disposed to enable each of the registered batch operations registered as reg. nos. 1, 2, 3, 4, 5 and 6 to be selected.

FIG. 3 shows an exemplary display after the selection button 37c of the registration 3 is pressed, and the batch operation button 33 is pressed. The batch operation is used, as the registered batch operation, to perform a document copy. In this case, on the right side of the batch operation selection button 37, contents of a series of operation items which are included in the batch operation for executing the document copy are shown.

Figure 5:
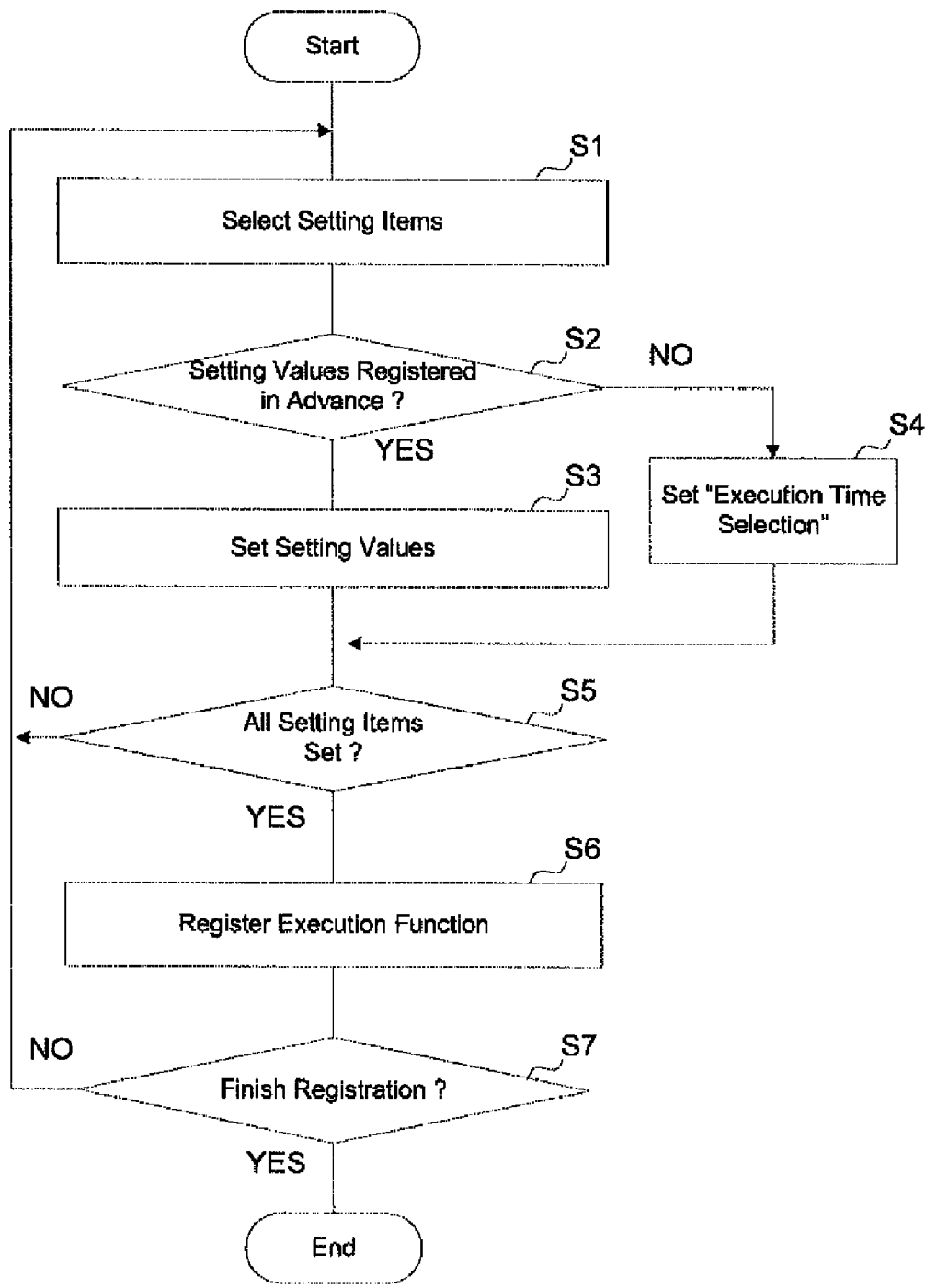
FIG. 5 is a flow diagram illustrating an operation to register the series of the operation items as the batch operation of the first embodiment.

Next, operation of the image forming device 10 having the above-mentioned configuration will be explained referring to FIGS. 4 and 5. At first, operation to register a series of operation items as the batch operation will be explained.

When the series of operation items are registered as the batch operation, a user presses the batch execution button 33 displayed on the screen of the display panel 11, and the batch execution screen as shown in FIG. 3 is displayed. In the batch execution screen, non-registered selection buttons 37a, 37b, 37c, 37d, 37e and 37f are pressed. Therefore, an operation to register the series of operation items as the batch operation is started.

After initiation of the registration operation, the user selects a setting item and judges whether the user registers a setting value in advance or designates the setting value at the time of executing the batch operation.

In the case of designating at the time of executing the batch operation, the user sets a value to detect that the user selects the setting value at the time of executing the batch operation. In other words, "execution time selection" is set as a value. In the case of registering the setting value in advance, the user sets the appropriate value in advance.

The user judges whether or not all setting items have been set. When there is an item to be set, the user selects the setting item again and repeats the subsequent operation described above until all setting items are set.

After setting all of the setting items, the user registers the function of a photocopier, scanner, printer or facsimile as an execution function.

The user judges whether or not to finish the registration. In the case of continuing the registration, the user selects the setting items again and repeats the subsequent operation described above. In the case of finishing the registration, the user saves the registration contents and finishes the registration.

As shown in FIG. 4, the registration contents are saved in the HDD 13 as a data table whose elements are individual operations such as setting the setting value and execution of functions. An example shown in FIG. 4 is registration contents of which the batch operation is a document copy. When the individual operation is for setting the setting value, the setting value is saved. When the individual operation is for the execution of functions, a value, "Execute," is set to express the execution of functions.

Referring to FIG. 4, an operation to register the series of operation items as a batch operation will be explained. At S1, setting items are selected. At S2, it is judged whether or not to register setting values in advance. When Yes, the operation proceeds to S3 so that the setting values are set. When No, the operation proceeds to S4 so that "Execution Time Selection" is set as the value. At S5, it is judged whether or not all the setting items are set. When all the setting items are set (Yes), the operation proceeds to S6 so that an execution function is registered. When all the setting items are not set (No; at least one setting item remains), the operation proceeds back to S1. At S7, it is determined whether or not the registration is finished. When Yes, the registration ends. When No, the operation returns to S1.

Referring now to FIGS. 6-13, a functional limitation having a possibility to make execution of the batch operation impossible will be explained.

Items to be a target of the functional limitation, or in other words functional limitations, include, for example, a limitation on printing number, a prohibition of one-side printing, a prohibition of color printing, and a prohibition of writing a scanned image in a portable storage medium. The functional limitation is realized by giving limitations to setting items and a single function provided by the image forming device 10.

As shown in FIG. 6, the functional limitations have corresponding individual Operations. As shown in FIG. 7, the individual operation items have corresponding single functions, or single function items, provided by the image forming device 10 and setting items. In FIGS. 8 and 9, the single function items and contents of setting items are shown. For example, in the case of copying, the function items include Print and Scan, and the setting items include Printing Number, Color/Mono and the like.

Two functional limitations can be set. One functional limitation is as a group user as classified by a manager regarding users of the image forming device 10 into a major classification, and the other functional limitation is as an individual user. As shown in FIGS. 10 and 11, a functional limitation corresponds to each group user and each individual user, and the functional limitation is realized as a limitation value set for each group user and each individual user about the respected functional limitation. Therefore, as shown in FIG. 12, a table has a limitation value of various functional limitations set for associates of the group user.

The manager sets the functional limitation in correspondence with the major classification, and sets the limitation value of the functional limitation to the individual user in order to control processing in more detail. The limitation value of the individual user is set above the limitation value of the group user. FIG. 13 shows a table where a limitation value of the functional limitation is set to user A of the individual user.

Next, an explanation is provided about operation to check whether or not the batch operation is practicably registered when an additional setting or a change is set to the functional limitation, and to generate an alternative method when the batch operation is impossible to register.

At first, the judging part 23 observes a new additional setting or a change, set by the manager, of the functional limitation. In other words, it repeatedly judges whether or not the new additional setting or the change is executed.

When the judging part 23 judges that the new additional setting or the change is executed, the judging part 23 reports the judgment to the batch operating part 22, reads out a registered batch operation stored in the HDD 13, and starts monitoring the registered batch operation; that is, it starts monitoring whether or not the registered batch operation is impossible to execute.

Next, based on a table like the tables in FIGS. 6 and 7, the judging part 23 judges whether or not individual operation items included in the registered batch operation are affected by the functional limitation; that is, the judging part 23 judges whether or not each of the individual operation items becomes impossible to execute because the new additional setting and change are set to the functional limitations. Specifically, the judging part 23 judges by comparing a limitation value with a setting value. The limitation value is for the functional limitation which corresponds to a group user to which registrants of the batch operation belong and a user name (FIGS. 12 and 13 shows the limitation value of user A of the associates). The setting value is the setting value of each of the individual operation items which are set in a data table defined as registration contents of the batch operation (one example of the setting value is printing circulation of 10 bunch shown in the table of FIG. 4.).

When the individual operation items are affected by the functional limitation, or in other words, when it is judged that the individual operation items are impossible to use, the judging part 23 stores the result that the batch operation is unusable (impossible to use) in the HDD 13 with an unusable judgment "ON." The result is stored corresponding to a value of the unusable judgment in the HDD 13.

Next, the judging part 23 judges whether or not there is an alternative individual operation. Namely, it is judged whether or not an alternative operation or an alternative setting exists, the operation and settings corresponding to the individual operation which became impossible to use by the functional limitation. In this case, the judging part 23 judges based on a table such as that shown in FIG. 14 which lists items which may be the alternative setting for the functional limitation.

When there is an alternative individual operation, the judging part 23 executes an alternative individual operation setting and applies the alternative individual operation to the registered batch operation, The judging part 23 rechecks the applied batch operation. When a value is unusable or unsuitable by the alternative operation or due to the change of the alternative setting, the value will be reset. As shown in FIG. 15, resetting about the unsuitable value is realized by a prior registration of a setting item and its value which become necessary when a setting item is changed.

The judging part 23 judges again whether or not there is an alternative individual operation and repeats the subsequent operation. When there is no alternative individual operation, that is, there is no alternative setting item, the judging part 23 saves the check result in the HDD 13.

The judging part 23 judges whether or not checks on all individual operation of the batch operation are finished. When the checks are not finished, the judging part 23 judges whether or not there is an alternative individual operation and repeats the subsequent operation.

When the checks on all individual operations are finished, the judging part 23 executes the checks on the next registered batch operation, and judges whether or not the checks on all registered batch operations are finished. When it is judged whether or not the individual operation items are affected by the functional limitation, and when the individual operation items are not affected, the judging part 23 judges whether or not the checks on all registered batch operations are finished. When the checks are not finished, again, the judging part 23 starts the check on the registered batch operation, and repeats the subsequent operation. When the checks on all registered batch operations are finished, the judging part 23 finishes the operation.

Figure 16:
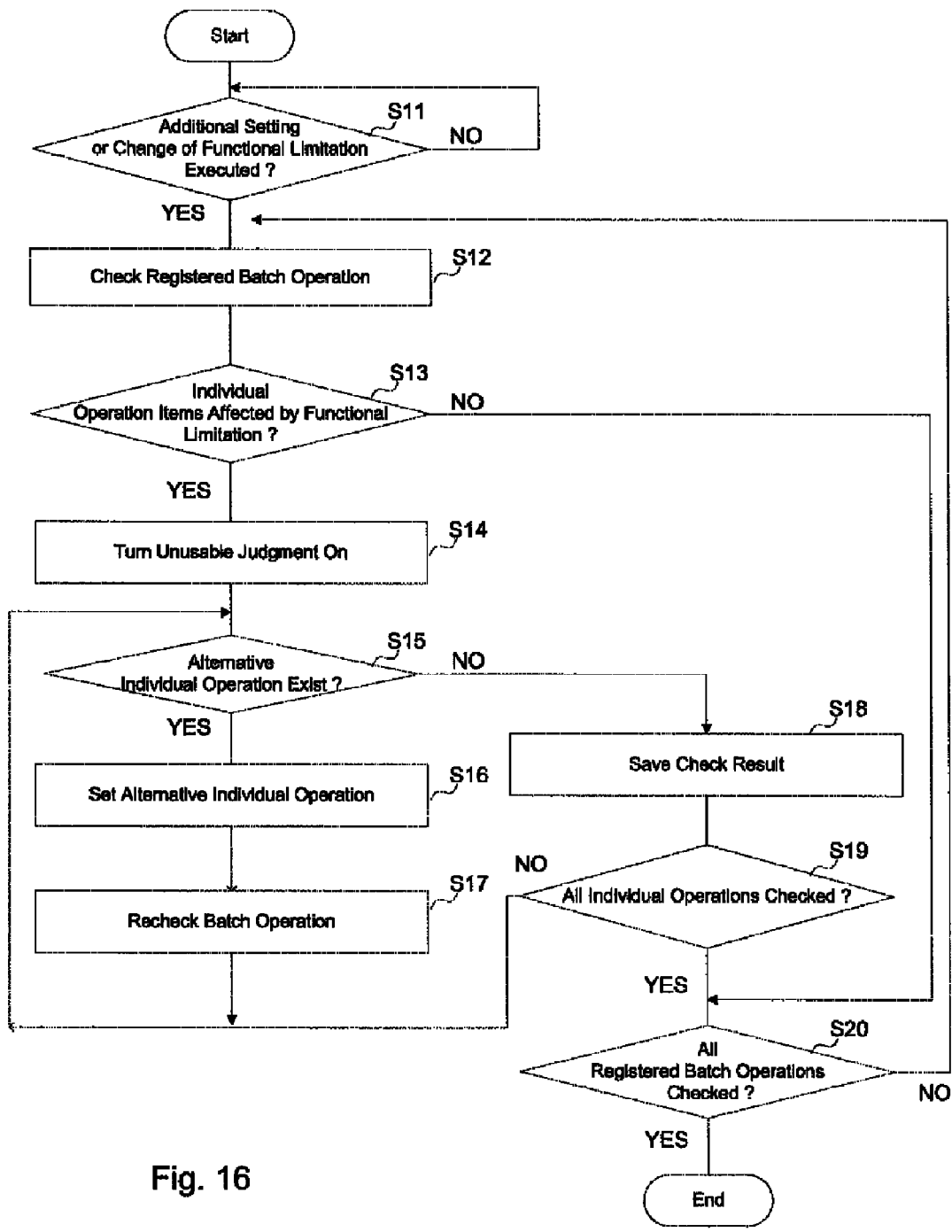
FIG. 16 is a flow diagram illustrating an operation which generates an alternative method where it is impossible to register the batch operation while an additional setting, or change, of the functional limitation is set according to the first embodiment.

FIG. 16 is a flow diagram illustrating an operation that is enabled when a batch operation is not able to be registered as a result of an addition, or a change, to the functional limitation. At S11, it is judged whether or not an additional setting, or a change, of a functional limitation has been executed. When Yes, the operation proceeds to S12. When No, it repeats until they are executed. At S12, the registered batch operation is checked. At S13, it is judged whether or not the individual operation items are affected by the functional limitation. When the individual operation items are affected by the functional limitation (Yes), the operation proceeds to S14. When No, the operation proceeds to S20. At S14, it turns an unusable judgment on. As S15, it is judged whether or not an alternative individual operation exists. When there is the alternative individual operation (Yes), the operation proceeds to S16. When No, the operation proceeds to S18. At S16, the alternative individual operation is set. At S17, the batch operation is rechecked. At S18, the check result is saved. At S19, it is judged whether or not all of the individual operations have been checked. When all individual operations have been checked (Yes), the operation proceeds to S20. When No, the operation returns to S15. At S20, it is judged whether or not all of the registered batch operations have been checked. When the cheeks on all registered batch operations are finished (Yes), the operation ends. When No, the operation returns to S12.

An alternative generated batch operation, which is an operation to execute an alternative batch operation, is explained referring to FIGS. 17 to 20. As a precondition, the registered batch operation is assumed to be impossible to execute as a result of a functional limitation.

The user logs on to the image forming device 10 and presses the batch execution button 33 displayed on the display panel 11. The screen of the display panel 11 is transmitted to the hatch execution screen as shown in FIG. 3.

Figure 17:
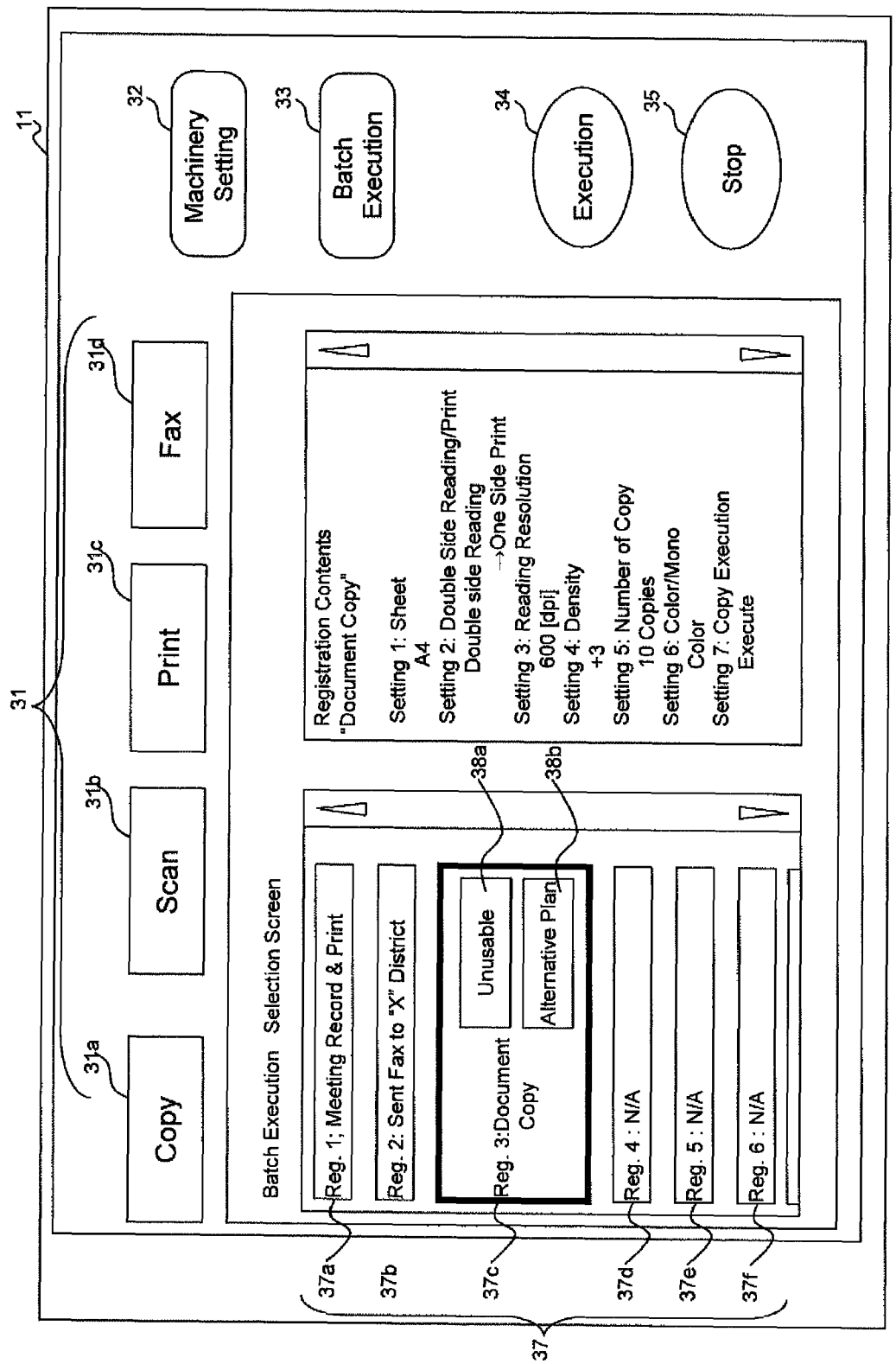
FIG. 17 illustrates an example of the panel of the image forming device of the first embodiment displaying that an alternative batch operation is generated.

When the screen is transmitted to the batch execution screen, the batch operating part 22 reads the judgment result stored in the HDD 13, which shows that the batch operation is impossible to execute. The display processing part 25 displays, as shown in FIG. 17, an unusable button 38*a* indicating that the batch operation is impossible to execute in a registered batch operation selection button 37. In the example of FIG. 17, the unusable button 38*a* is displayed in the selection button 37*c* for choosing the registered batch operation of the reg. 3 (Document Copy).

Then, the display processing part 25 judges whether or not there is an instruction to display an unusable reason. Namely, the part 25 judges whether or not the user requested to display the reason why the batch operation is impossible to execute. In this case, the display processing part 25 judges based on whether or not the user pressed the unusable button 38*a*.

Figure 18:
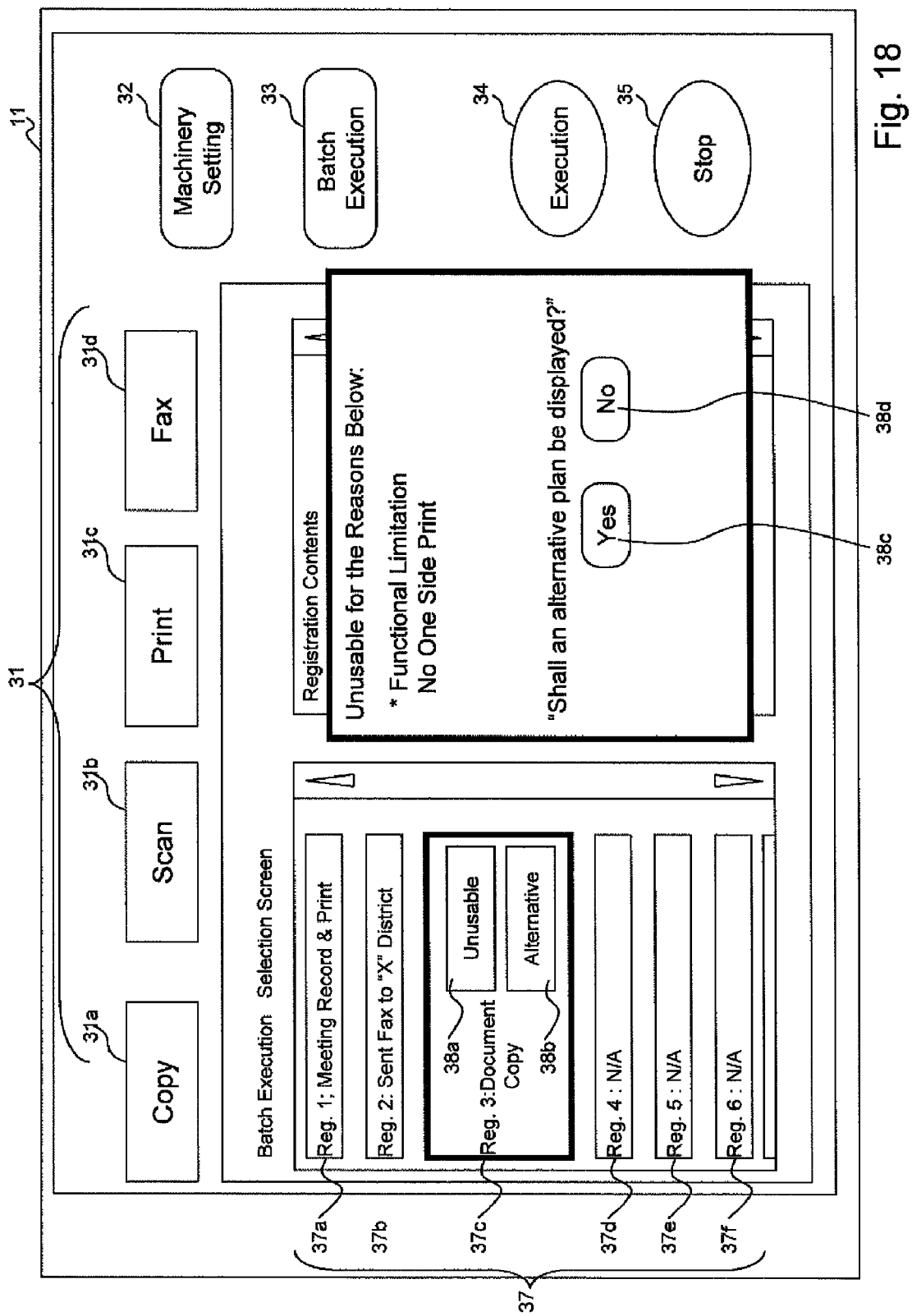
FIG. 18 illustrates an example that the panel of the image forming device of the first embodiment displays a reason why the batch operation is inexecutable.

When the user does not press the unusable button 38*a*, the display processing part 25 repeatedly judges whether or not it is requested to display the unusable reason. When the user presses the unusable button 38*a*, the display processing part 25 judges that there is a request to display the unusable reason, and displays the unusable reason, which is the reason why the registered batch operation has become impossible to execute, as shown in FIG. 18. In addition, when the alternative batch operation is saved in the HDD 13, the display processing part 25 displays selection buttons 38*c* and 38*d* to enable a user to select an alternative method to request either displaying or not displaying the alternative batch operation in a display of the unusable reason.

The display processing part 25 judges whether or not alternative operation instructions exist. Namely, the part 25 judges whether or not the user requested to display contents of the alternative batch operation. In this case, the display processing part 25 judges based on which of the selection buttons 38*c* or 38*d* the user presses.

Figure 19:
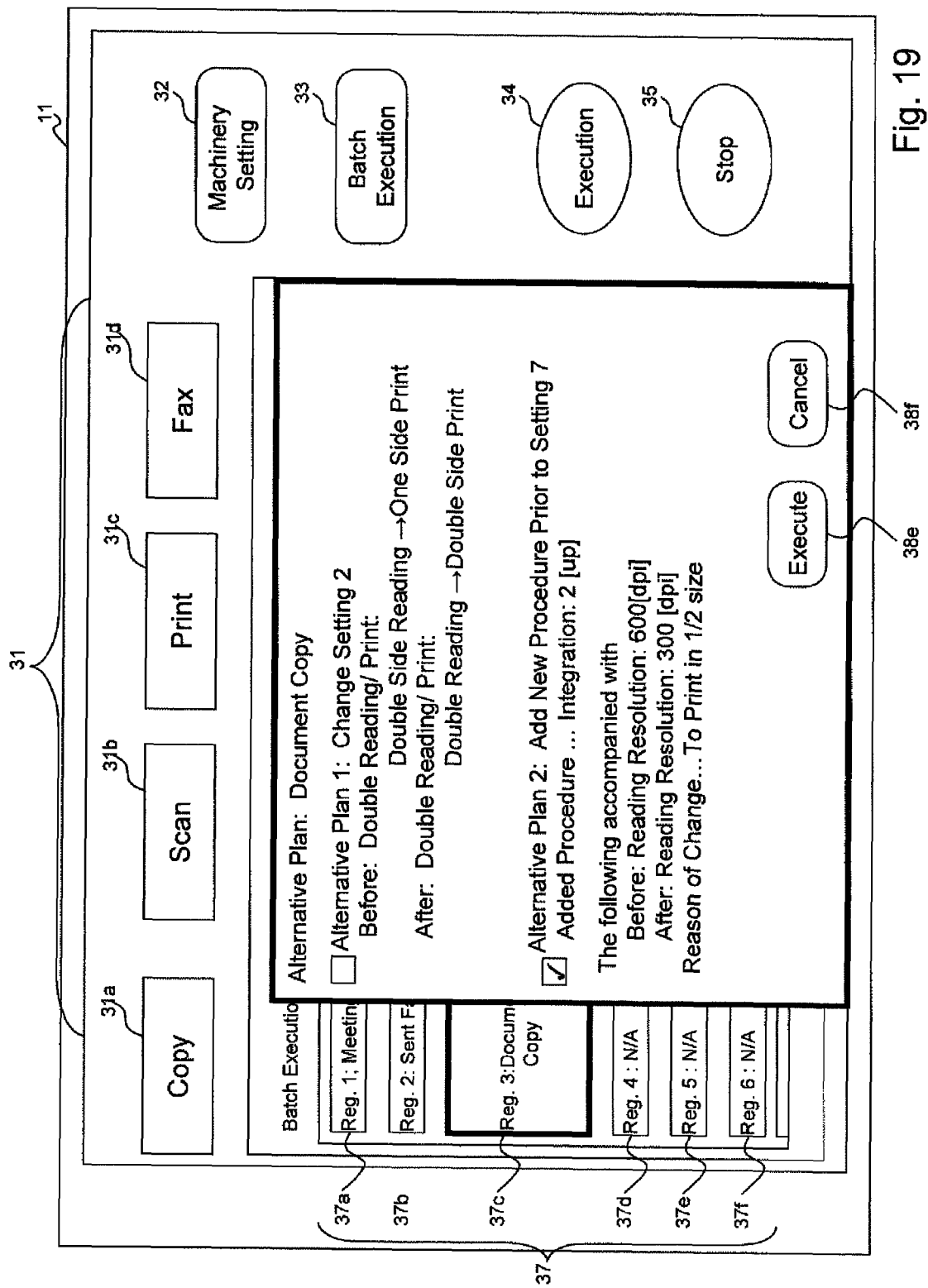
FIG. 19 illustrates an example that the panel of the image forming device of the first embodiment selectively displays the alternative hatch operation. The panel of the image forming device of the first embodiment of the present invention displays a plural number of the alternative batch operations as the user can select one of the alternative batch operations.)

When the user presses the selection button 38*d*, the display processing part 25 judges that the instructions of the alternative operation do not exist. Then, the display processing part 25 judges whether or not a display instruction exist regarding the unusable reason. The subsequent operation then repeats. When the user presses the selection button 38*c*, the display processing part 25 judges that the display instruction of the alternative operation exists, and as shown in FIG. 19, displays an alternative operation (or an alternative batch operation). In addition, in FIG. 19, the alternative operation is displayed as an alternative plan. The display processing part 25 displays the selection buttons 38*e* and 38*f* to enable the user to execute or not execute the alternative batch operation through the display of the alternative batch operation.

The display processing part 25 judges whether or not the user instructs the alternative operation to be executed. Namely, the display processing part 25 judges whether or not the user selects the alternative batch operation and requires the selected alternative batch operation to be executed. In this case, it is judged based on which of the selection buttons 38*e* and 38*f* the user presses.

When the user presses the selection button 38*f*, the display processing part 25 judges that the execution of the alternative operation is not instructed. Then, the display processing part 25 judges whether or not the display instruction of the alternative operation exists, and the subsequent process repeats.

When the user presses the selection button 38e, the display processing part 25 judges that the execution of the alternative operation is instructed, the batch operating part 22 executes the batch execution according to the alternative operation, and ends the process. In other words, the batch operating part 22 executes the selected alternative batch operation, and ends the process.

Next, execution of the alternative batch operation will be explained with reference to FIG. 20. At S31, the batch execution screen is displayed. At S32, it is judged whether or not an instruction to display an unusable reason exists. When the instruction exists (Yes), the operation proceeds to S33. When No, it repeats the judgment until the instruction exists. At S33, the unusable reason is displayed. At S34, it is judged whether or not an instruction to display the alternative operation exists. When Yes, the operation proceeds to S35. When No, the operation returns to S32. At S35, the alternative operation is displayed. At S36, it is judged whether or not execution instructions of the alternative operation exist. When Yes, the operation proceeds to S37. When No, the operation returns to S32. At S37, a batch execution by the alternative operation is executed, and the operation ends.

As described above, in the present embodiment, when a manager sets the new additional setting or the change to the setting contents of the functional limitation of the image forming device 10, it is judged whether or not the new additional setting or the change affects the already registered batch operation. When the registered batch operation becomes impossible to execute, the alternative batch operation is generated. When the user who previously registered the batch operation uses the image forming device 10, the batch execution screen on the display panel 11 displays a notice that the registered batch operation is impossible to execute. Accordingly, the user can realize that the batch operation, registered by the user, becomes impossible to execute (inexecutable) along with the reason.

The batch execution screen displays the contents of the alternative batch operation, which is generated as an alternative operation of/for the inexecutable batch operation (the batch operation which was previously decided as inexecutable). The user confirms contents of setting, function, etc. of the alternative batch operation. When the user accepts the contents and the function, the user can execute the alternative batch operation without any extra burden.

For example, when the user selects the batch operation which is registered as the registration 3 (Document Copy) as shown in FIG. 17 in order to print the registered job data, but the batch operation has been judged as being inexecutable, a first alternative plan and a second alternative plan as shown in FIG. 19 are displayed as alternative batch operations on the display panel 11. For example, in the second alternative plan, a resolution decreases from 600 (dpi) to 300 (dpi). However, the scale of the print also is half. It is assumed that the quality of the print will not be greatly deteriorated. Accordingly, the user can select the second alternative plan. When the second alternative plan is selected, the resolution is decreased so that the consumption of toner ink is decreased, which is a secondary advantage. Namely, the second alternative plan is an alternative batch operation including an alternative print scale reduction ratio and an alternative resolution ratio. The alternative print scale reduction ratio is smaller than another print scale reduction ratio when the batch operation is inexecutable. The alternative resolution ratio is smaller than another resolution ratio when the batch operation is inexecutable.

Next, a second embodiment of the present invention will be explained referring to FIGS. 21 and 22. Features having the same configuration as the first embodiment are identified by the same references numbers, and the explanation will therefore be omitted.

Figure 21:
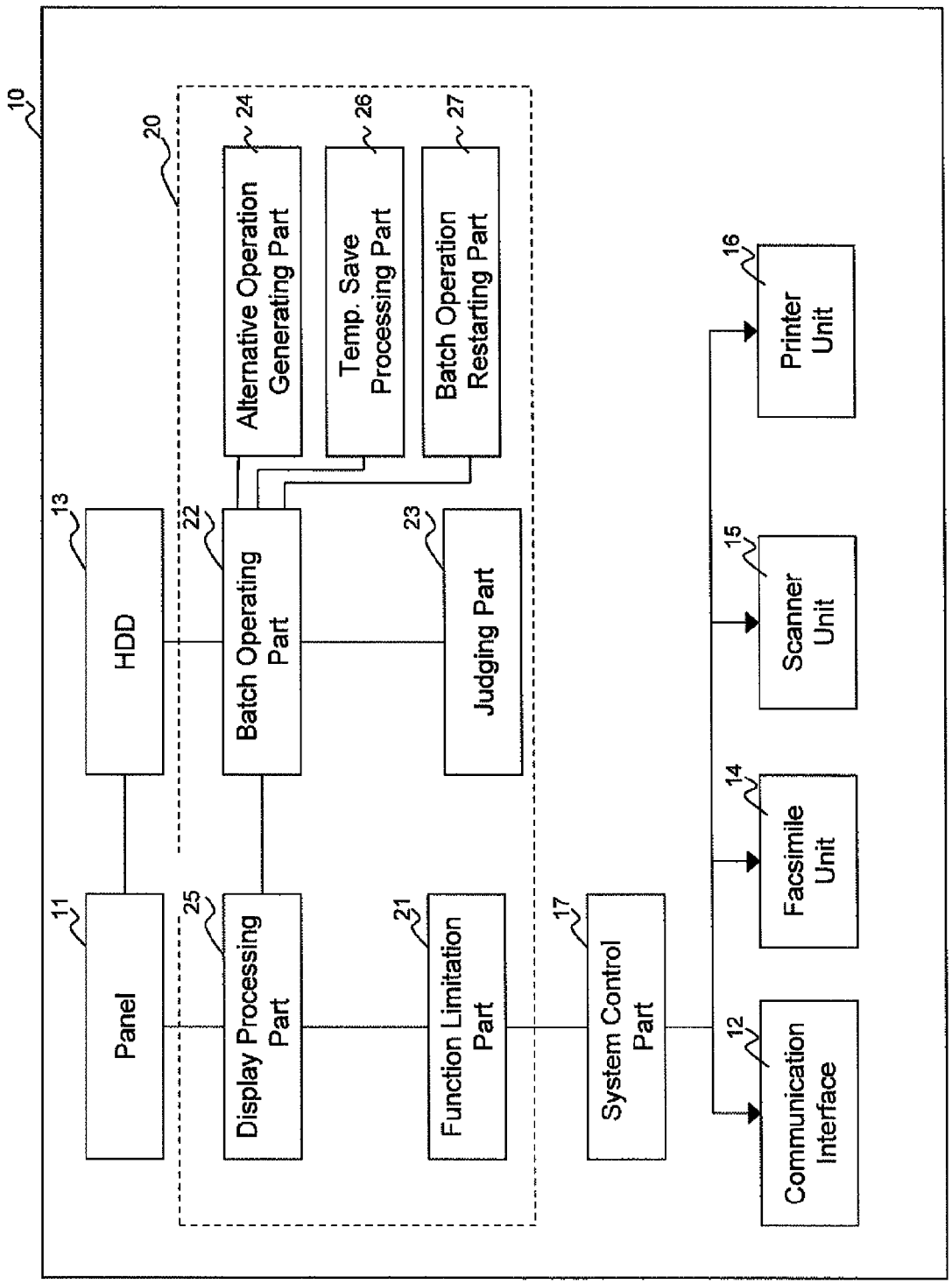
FIG. 21 is a block diagram illustrating a configuration of the image forming device of a second embodiment.

In the second embodiment, as shown in the FIG. 21, the image forming device 10 further has a temporary save processing part 26 and a batch operation restarting part 27.

The temporary save processing part 26 temporarily saves a state in the middle of execution of the batch operation or the alternative batch operation. Specifically, the execution of the batch operation or the alternative batch operation is stopped (or temporarily stopped) when all of the executable individual operations of the batch operation including the alternative batch operation are executed. A limitation value (data table shown in FIG. 13) and information regarding which of the individual operations are executed are saved. Herein, the individual operations are related to either the batch operation or the alternative batch operation. Using the saved limitation value and the information, the stopped batch operation or the alternative batch operation can be restarted. The recorded information on which individual operations were executed is saved in the data table to which the information is added as shown in FIG. 4.

FIG. 22 shows an example regarding registered contents. The contents include the following: image data scanned by the scanner and saved as electronic data in a designated folder on a region prepared for the user to use in the HDD 13, the print is color, and the copy number is 10. In this example, the contents indicate that the process is stopped between no. 5 individual operation (Local Folder Designation) and no. 6 individual operation (Local Folder To Print Execution). The no. 5 operation means that the electronic data is read from the "Local Folder," and the no. 6 operation means that the read date is to be printed.

When the batch operation restarting part 27 receives data to temporarily relax the functional limitation, the batch operation restarting part 27 restarts (or resumes) the batch operation that is saved in the temporary save processing part 26.

Because the configurations of the other parts except for the above-mentioned parts are same as the first embodiment, explanation will be omitted.

Next, operation of the image forming device 10 of the present embodiment will be explained. At first, an operation to stop the batch operation will be explained referring to FIG. 23.

The user logs in to the image forming device 10, and presses the batch execution button 33 displayed on the display panel 11. The screen of the display panel 11 is transmitted to the batch execution screen shown in FIG. 3.

Figure 20:
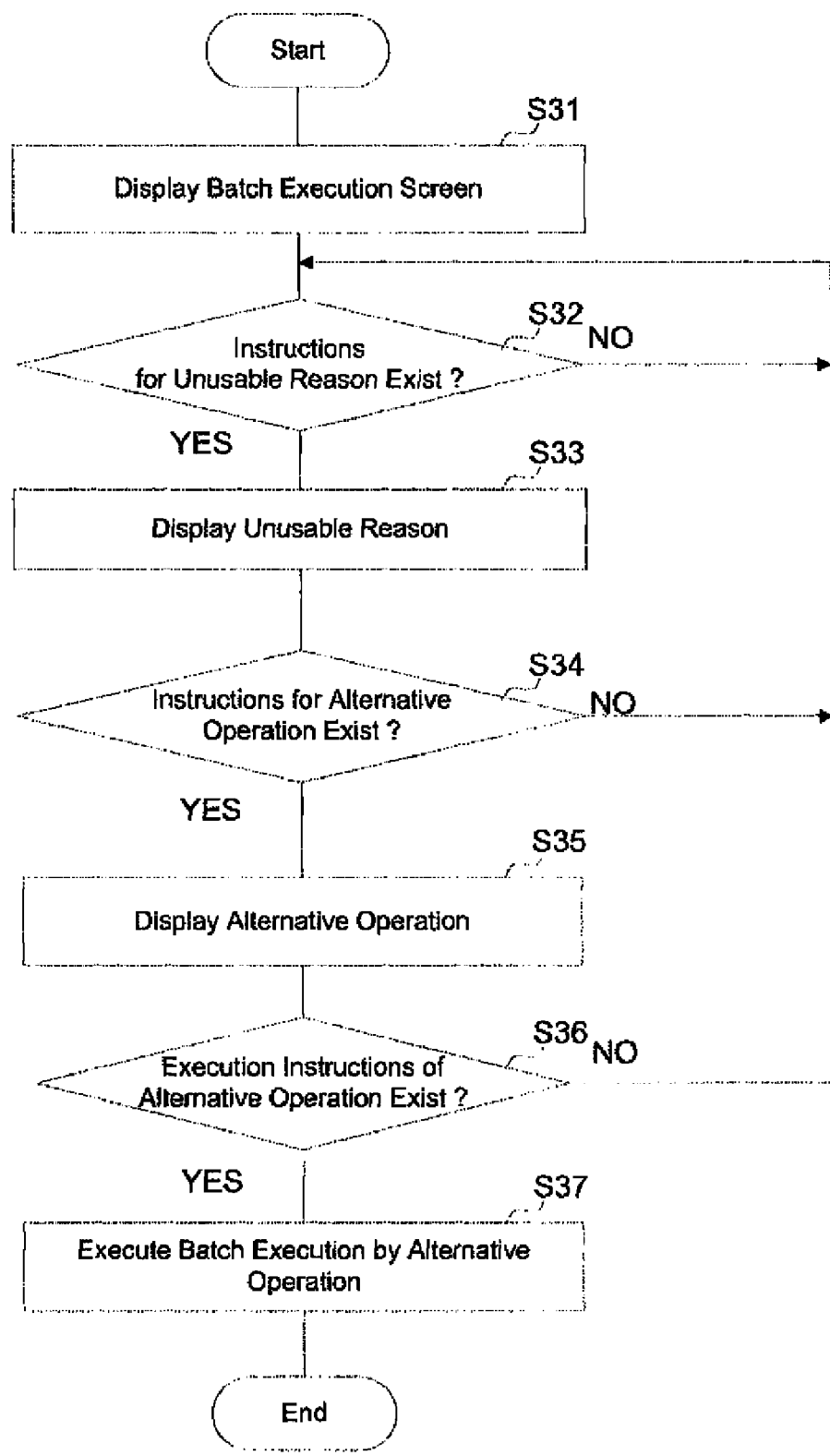
FIG. 20 is a flow diagram illustrating an operation which executes the alternative batch operation of the first embodiment.
Figure 23:
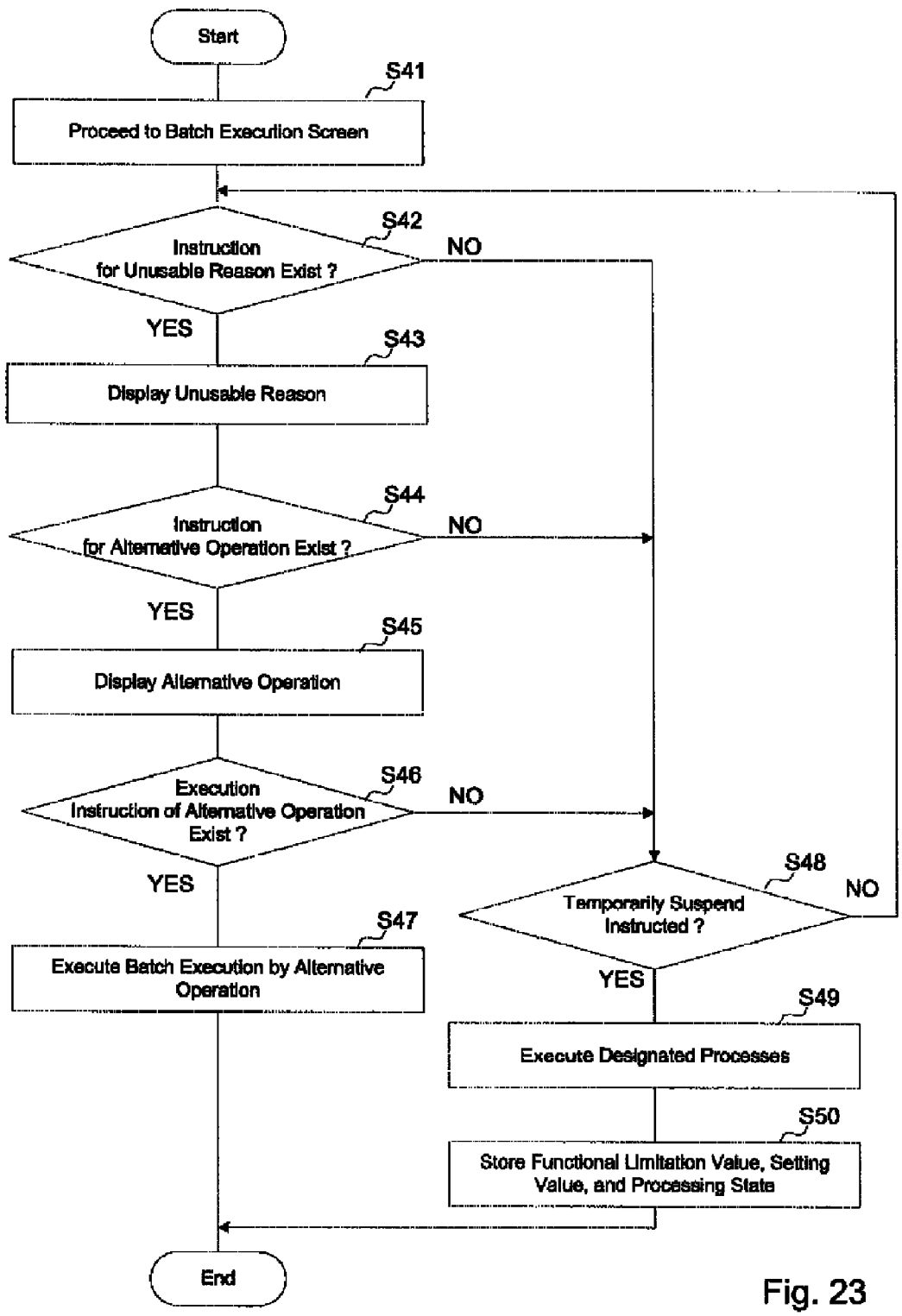
FIG. 23 is a flow diagram showing the operation to stop the batch operation of the second embodiment.

The operations from the batch execution screen are displayed until the batch execution is executed by the alternative operation; namely, the operations of S41-S47 shown in FIG. 23, are the same as the operations of S31-S37 shown in FIG. 20 as described in the first embodiment. Therefore, the explanation will be omitted.

The display processing part 25 judges whether or not the user entered instructions to temporarily stop processing after all executable operations are completed in the following cases: when it is judged whether or not the unusable reason is instructed to display, and it is not instructed; when it is judged whether or not it is instructed to display contents of the alternative batch operation, and it is not instructed; and when it is judged whether or not an execution of the alternative operation is instructed, and it is not instructed. Namely, the display processing part 25 judges whether or not the user requests to stop the execution of the batch operation at the last executable individual operation. Herein, when the user does not instruct to temporarily stop the process at the last executable operation, it is judged whether or not the unusable reason is instructed to be displayed.

When the user instructs to temporarily stop the process after all executable operations are done, the batch operating part 22 executes all executable operations, then temporary stops. In other words, the batch operation is executed up to the last executable individual operation.

The temporary save processing part 26 saves a functional limitation value, a setting value, and an execution condition, and ends the operation. In other words, the limitation value of the functional limitation and the processing state of the batch operation are saved as the data table in the HDD 13 together with the setting value which was set in the setting items, and the operation is finished.

Next, an operation to stop that above-discussed batch operation will be explained with respect to FIG. 23. At S41, the operation proceeds to the batch execution screen. At S42, it is judged whether or not an instruction to display an unusable reason exists. When Yes, the operation proceeds to S43. When No, the operation proceeds to S48. At S43, the unusable reason is displayed. At S44, it is judged whether or not an instruction to display an alternative operation exists. When Yes, the operation proceeds to S45. When No, the operation proceeds to S48. At S45, the alternative operation is displayed. At S46, it is judged whether or not an execution instruction of the alternative operation exists. When Yes, the operation proceeds to S47. When No, the operation proceeds to S48. At S47, a batch execution is executed by executing the alternative operation, and the process ends. At S48, it is judged whether or not a suspension is instructed after all executable processes are done (or when the last executable operation is done). When Yes, the operation proceeds to S49. When No (no instruction for the suspension), the operation returns to S42. At S49, all designated processes are executed. At S50, the functional limitation value, the setting value, and the processing state are saved, and the operation ends.

Figure 25:
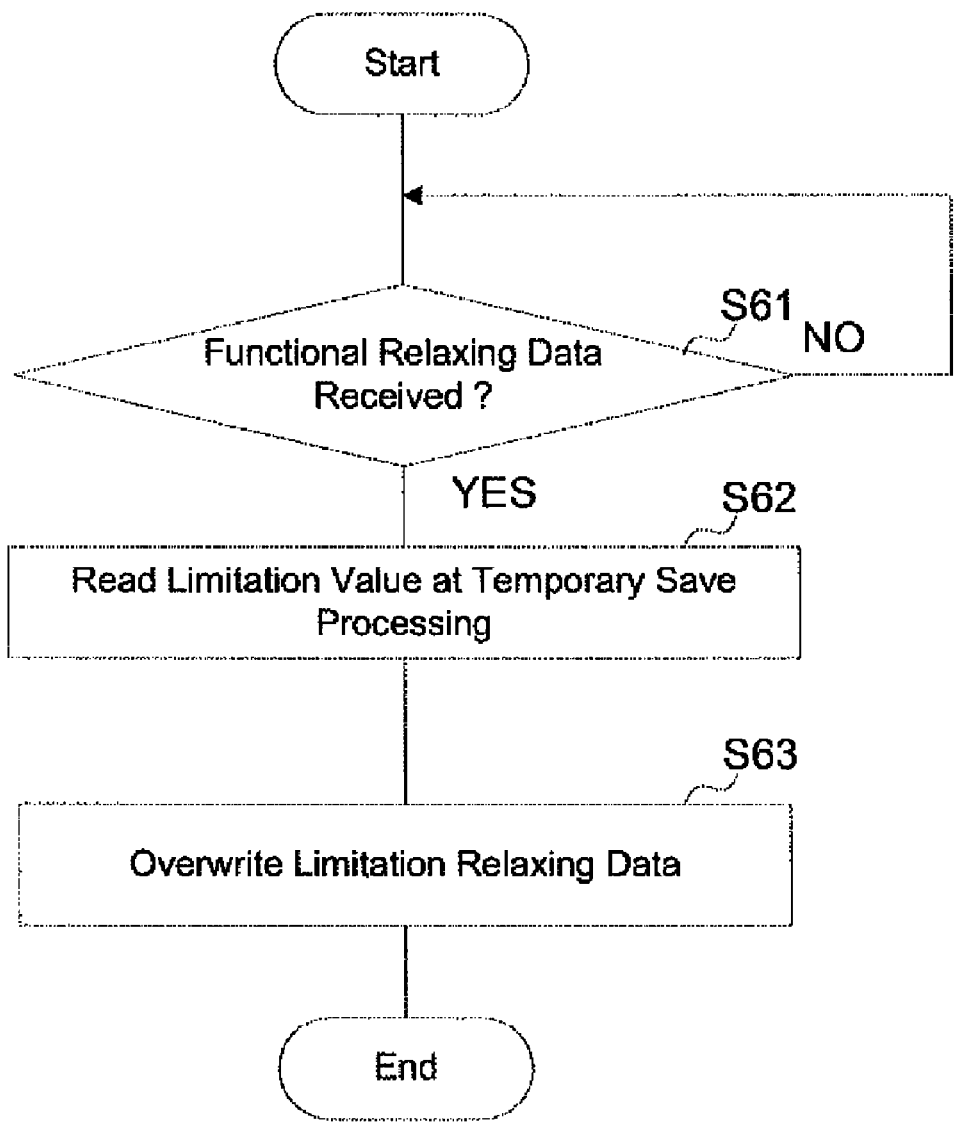
FIG. 25 is a flow diagram showing an operation of when the limitation relaxing data of the second embodiment is received.

Referring to FIGS. 24 and 25, operation of the image forming device according to the present embodiment will be discussed when data to temporarily relax the functional limitation is received.

At first, the user who executed the suspension of the batch operation asks the manager. When the manager decides that the functional limitation may be temporarily relaxed, the manager provides overwrite data for the limitation value of the functional limitation to the image forming device 10 in order to temporarily relax the functional limitation. The overwrite data can be provided by the manager either via the display panel 11 or via the communication network. In the embodiment, it is assumed that the overwrite data is provided via the communication network.

The batch operation restarting part 27 judges whether or not functional relaxing data was received. Namely, the part 27 judges whether or not the overwrite data input by the manager was received from the communication interface 12 via the communication network. When the functional relaxing data was not received, the batch operation restarting part 27 repeats the judgment that is whether or not the functional relaxing data was received. In other words, the batch operation restarting part 27 waits until the functional relaxing data is received.

When the functional relaxing data was received, the batch operation restarting part 27 reads the limitation value from the HDD 13. The limitation value is for the functional limitation corresponding to the received functional relaxing data. Specifically, the limitation value is a value of the functional limitation that was temporarily saved in the HDD 13 when the execution of the batch operation was stopped after the last executable individual operation was done.

The batch operation restarting part 27 executes an overwriting operation for the functional relaxing data, then ends the process. In other words, the batch operation restarting part 27 overwrites the limitation value of the functional limitation read from the HDD 13 with the received overwrite data, and ends the process.

For example, in FIG. 22, "Local Folder To Print" is set as unusable. When the limitation value of the functional limitation for prohibiting reading from "Local Folder" is overwritten with the overwrite data, "Local Folder To Print" becomes unusable. The limitation value of the functional limitation is a reason why "Local Folder To Print" is set as unusable. The overwrite date is used for temporarily allowing data to be read from "Local Folder" which is included in the table shown in FIG. 24 or the like.

Next, an operation for temporarily relaxing the functional limitation will be explained referring to FIG. 25. At S61, it is judged whether or not the functional relaxing data is received. When Yes, the operation proceeds to S62. When No, it repeats the process until the data is received. At S62, the limitation value at a temporary save process is read. At S63, the limitation relaxing data is overwritten, and the process ends.

Figure 26:
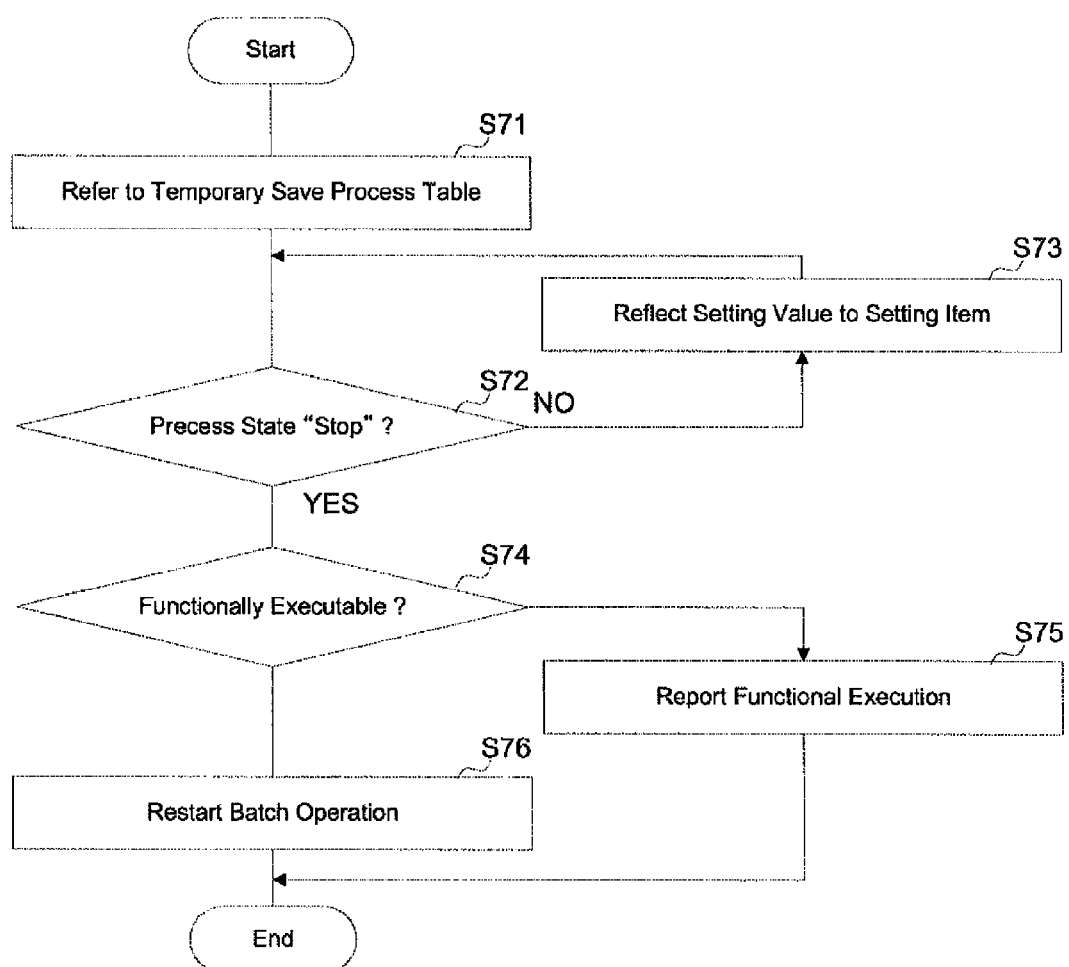
FIG. 26 is a flow diagram showing the operation to restart the temporarily stopped batch operation of the second embodiment.

Next, operation to restart a temporarily stopped batch operation will be explained referring to FIG. 26.

At first, the user who received a notice from the manager logs in to the image forming device 10, and presses the batch execution button 33 displayed on the display panel 11. The screen of the display panel 11 is transmitted to the batch execution screen as shown in FIG. 3. The user provides instructions to restart the temporarily stopped batch operation.

The batch operation restarting part 27 refers to a temporary save process table. Namely, the limitation value of the functional limitation and the processing state of the batch operation are read from the HDD 13. Herein, the functional limitation is saved as a data table together with a setting value set in the setting item in the HDD 13.

Next, the batch operation restarting part 27 judges whether or not the processing state is "Stop." Namely, the batch operation restarting part 27 judges whether or not the processing state of each individual operation of the batch operation is "Stop." When the processing state is not "Stop," in short, when the judged individual operation is already executed, the batch operation restarting part 27 compares the setting value with the setting item. Then, the part 27 judges again whether or not the processing state is "Stop." In other words, the setting value of the setting item is newly set, and it is judged whether or not the processing states of all of the individual operations are "Stop".

When the processing state is judged as "Stop," the hatch operation restarting part 27 judges whether or not the functional execution is functionally executable. Namely, it is judged whether or not the batch operation can he restarted when the limitation value of the functional limitation was overwritten with the overwrite data provided by the manager.

When the processing state is functionally executable, the batch operation restarting part 27 restarts the batch operation and ends the operation. Namely, the batch operation is resumed from the temporarily stopped individual operation of which the processing state was "Stop," and the operation ends. When the processing state is not functionally executable, the batch operation restarting part 27 reports that the processing state is inexecutable, and ends the operation. Namely, the batch operation restarting part 27 displays on the display panel 11 that the batch operation is inexecutable and its reason. Then, the part 27 ends the operation.

Next, a flow diagram will be explained referring to FIG. 26. At S71, the temporary save process table is referenced. At S72, it is judged whether or not the process state is "Stop." When the process state is "Stop" (Yes), the operation proceeds to S74. When No, the operation proceeds to S73. At S73, the setting value is reflected to the setting item, and the operation returns to S72. At S74, it is judged whether or not it is functionally executable. When Yes, the operation proceeds to S76. When No, the operation proceeds to S75. At S75, it is reported that it is functionally executable, and the operation ends. At S76, the batch operation is restarted, and the operation ends.

As described above, in the present embodiment, when the new additional setting and the change are set to the setting contents of the functional limitation of the image forming device 10 by, for example, the manager, and the registered batch operation becomes impossible to execute, the batch operation is temporarily stopped after all executable individual operations are executed. However, the batch operation can be started by the manager providing the data which temporarily relaxes the functional limitation from an individual operation which was previously judged inexecutable and which is listed first among all inexecutable individual operations. Therefore, even if the alternative batch operation is inexecutable, the user can execute the operations without extra burden.

In addition, in the present embodiment, only the operation to restart the batch operation was explained. However, the alternative batch operation is also able to be restarted in the view of the invention.

In the first and second embodiments, only the case that the image forming device 10 is the MFP was explained. However, the present invention can be suitable not only for the MFP but also a printer, a facsimile, a copier, and the like.

A description of the preferred embodiment according to the present invention was given above in detail. However, it should be appreciated that a wide variety of alterations and modifications are possible as far as they do not depart from the spirit and scope of the attached claims.

What is claimed is:

1. An image forming device for obtaining image data and forming an image, comprising:
   a functional limitation part configured to set a functional limitation for a function provided by the image forming device;
   a storage medium configured to store a plurality of batch operations;
   a display processing part configured to display the plurality of batch operations for selection and to receive an instruction for executing a selected one of the plurality of batch operations;
   a batch operating part configured to register a series of functions as one batch operation in the storage medium, and to continuously execute each of the functions of the selected one of the plurality of batch operations upon receipt of the instruction;
   a judging part configured to compare a new limitation or a changed limitation with the series of the functions of each of the plurality of batch operations stored in the storage medium, and to judge whether or not each of the plurality of batch operations is executable when the functional limitation part adds the new limitation to or changes setting contents of the functional limitation; and
   an alternative operation generating part configured to generate an alternative batch operation that is an alternative of at least one of the plurality of batch operations when the at least one of the plurality of batch operations is judged inexecutable.

2. The image forming device of claim 1, wherein
the display processing part is configured to display a judgment result judged by the judging part and the alternative batch operation generated by the alternative operation generating part.

3. The image forming device of claim 1, further comprising:
   a temporary save processing part configured to temporarily save a processing state of at least one of an executed batch operation and the alternative batch operation,
   a batch operation restarting part configured to receive data for temporarily relaxing the functional limitation, and to restart one of the executed batch operation and the alternative batch operation from the processing state which are temporally saved by the temporary save processing part.

4. The image forming device of claim 3, wherein
the functional limitation includes a functional limitation item that is saved as corresponding to an alternative setting.

5. The image forming device of claim 4, wherein
the functional limitation item is selected from the group including: no one side print; limitation of copy number; no color print, and
the alternative setting is selected from the group including: integration setting (2up, 4up, or 8up); color/mono setting.

6. The image forming device of claim 2, further comprising:
   a temporary save processing part configured to temporarily save a processing state of at least one of an executed batch operation and the alternative batch operation,
   a batch operation restarting part configured to receive data for temporarily relaxing the functional limitation, and to restart one of the executed batch operation and the alternative batch operation from the processing state which are temporally saved by the temporary save processing part.

7. The image forming device of claim 6, wherein
the display processing part is further configured to judge whether or not a user has provided instructions to temporarily stop the executed batch operation; and
the temporary save processing part is configured to save batch operation data including a functional limitation value, a setting value and an execution condition of the executed batch operation.

8. The image forming device of claim 7, further comprising:
   a communication interface configured to connect the display processing part to a display panel and a communication network, wherein the display processing part is configured to receive data from at least one of the display panel and the communication network through the communication interface.

9. The image forming device of claim 8, wherein
the batch operating restarting part is configured to overwrite the batch operation data in the temporary save processing part with functional relaxing data upon receiving the functional relaxing data from the communication interface.

10. The image forming device of claim 6, wherein
the temporary save processing part is configured to temporarily store a judgment result of the judging part; and the alternative operation generating part is configured to read the judgment result from the temporary save processing part and to communicate with the display processing part to cause a display panel to display an unusable button indicating that the batch operation is inexecutable.

11. The image forming device of claim 8, wherein the display processing part is configured to cause the display panel to display a button for enabling the alternative batch operation to be selected.

12. The image forming device of claim 8, wherein the display processing part is configured to cause the display panel to display alternative batch operations when the alternative batch operation button is selected.

13. The image forming device of claim 1, wherein the alternative batch operation includes an alternative print scale reduction ratio and an alternative resolution ratio, the alternative print scale reduction ratio being smaller than another print scale reduction ratio when the batch operation is inexecutable, the alternative resolution ratio being smaller than another resolution ratio when the batch operation is inexecutable.

14. An image forming device, comprising:
a functional limitation part configured to set, add and change a functional limitation for a plurality of functions provided by the image forming device;
a storage medium configured to store a plurality of batch operations;
a display processing part configured to display the plurality of batch operations for selection and to receive an instruction for executing a selected one of the plurality of batch operations;
a batch operating part configured to register a series of functions as one batch operation in the storage medium, and to continuously execute each of the functions of the selected one of the plurality of batch operations upon receipt of the instruction;
a judging part configured to compare a functional limitation set, added or changed by the functional limitation part with the series of the functions of each of the plurality of batch operations stored in the storage medium, and to judge whether or not each of the plurality of batch operations is executable based on the functional limitation set, added or changed by the functional limitation part; and
a display part configured to display that at least one of the plurality of batch operations is inexecutable based on the functional limitation, for the at least one of the plurality of batch operations determined inexecutable by the judging part.

* * * * *